W. H. KNIGHT.
REGENERATIVE SYSTEM FOR STOPPING AND STARTING CARS AND TRAINS.
APPLICATION FILED JUNE 30, 1906. RENEWED OCT. 4, 1913.

1,134,682.

Patented Apr. 6, 1915.
6 SHEETS—SHEET 1.

W. H. KNIGHT.
REGENERATIVE SYSTEM FOR STOPPING AND STARTING CARS AND TRAINS.
APPLICATION FILED JUNE 30, 1906. RENEWED OCT. 4, 1913.

1,134,682.

Patented Apr. 6, 1915.

W. H. KNIGHT.
REGENERATIVE SYSTEM FOR STOPPING AND STARTING CARS AND TRAINS.
APPLICATION FILED JUNE 30, 1906. RENEWED OCT. 4, 1913.

1,134,682.

Patented Apr. 6, 1915.

Witnesses

Inventor

W. H. KNIGHT.
REGENERATIVE SYSTEM FOR STOPPING AND STARTING CARS AND TRAINS.
APPLICATION FILED JUNE 30, 1906. RENEWED OCT. 4, 1913.

1,134,682.

Patented Apr. 6, 1915.

W. H. KNIGHT.
REGENERATIVE SYSTEM FOR STOPPING AND STARTING CARS AND TRAINS.
APPLICATION FILED JUNE 30, 1906. RENEWED OCT. 4, 1913.

1,134,682. Patented Apr. 6, 1915.
6 SHEETS—SHEET 6.

THE NORRIS PETERS CO., PHOTO-LITHO., WASHINGTON, D. C.

UNITED STATES PATENT OFFICE.

WALTER H. KNIGHT, OF PROVIDENCE, RHODE ISLAND.

REGENERATIVE SYSTEM FOR STOPPING AND STARTING CARS AND TRAINS.

1,134,682. Specification of Letters Patent. Patented Apr. 6, 1915.

Application filed June 30, 1906, Serial No. 324,222. Renewed October 4, 1913. Serial No. 793,484.

*To all whom it may concern:*

Be it known that I, WALTER H. KNIGHT, a citizen of the United States, residing at Providence, county of Providence, Rhode Island, have invented a new and useful Regenerative System for Stopping and Starting Cars and Trains, of which the following is a specification.

The present invention relates to a system of operating cars and trains wherein the energy expended in stopping the same is stored and used again in starting, and the invention is particularly applicable to the modern rapid transit systems in which trains are operated under short headway at high rates of speed and have fixed station stops at substantially regular intervals. In such systems the load upon the power house is very unevenly distributed, the high acceleration required demands heavy and expensive installation, which, both as to the stationary and the moving plant has to be designed to stand the heaviest strain which may come upon it; the acceleration obtained is not equal to the demand, resulting in loss of time, and yet owing to the positive non-yielding character of the electric current is attained at the cost of comfort to the traveling public and great strain upon the rolling stock, while the strains of stopping are the cause of great wear and tear and breakage of parts, great loss of power, development of noise and discomfort to the public, owing to the irregular and jerky character of the brake action.

Some of the objects of my invention are, to increase the average speed of such cars or trains, reduce the power required to operate them and the wear and tear on car equipment, equalize the load on the power house, and render some of its service available for extensions or other uses; reduce the weight and size of motors, and largely eliminate noise and the dust due to the friction of the brakes, while attaining higher acceleration with an easier stopping and starting motion, thus increasing the comfort of the traveling public.

My invention comprises means located at the individual stations for compressing and storing air and means carried by the train, and preferably by each car of the train, for coupling the train to the air compressing means as the train approaches a station, and stopping the train while thus storing in the compressed air the energy expended in stopping the train; the coupling means being so designed and operated as to enable the starting of the train by the use of the compressed air, and in either direction required.

In the accompanying drawings I have exhibited the invention in its simplest form, and I will first describe the system with reference to said drawings, and then point out in the claims the novel elements and combinations.

Figure 1:
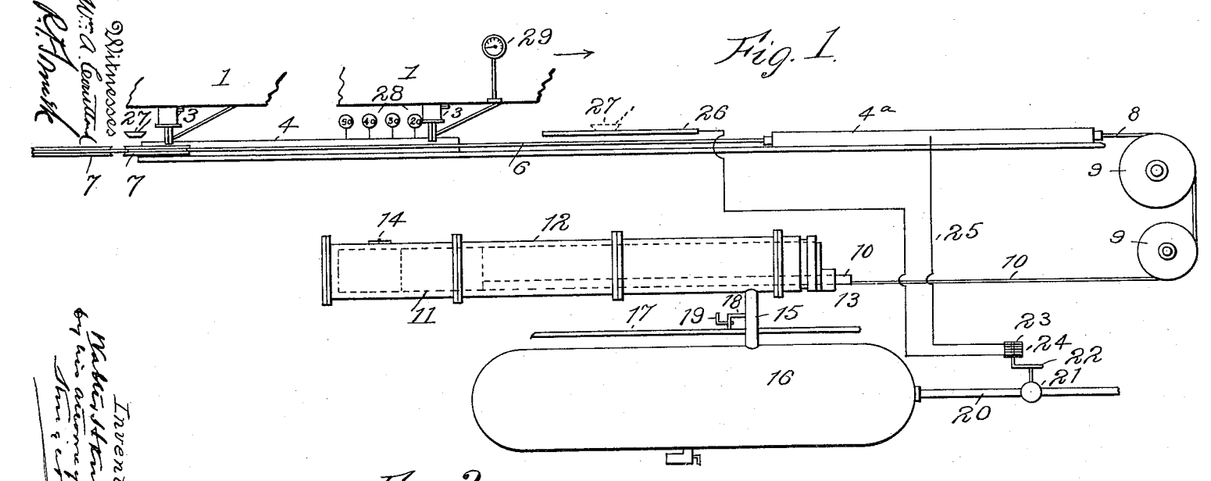
Figure 1 is a partly diagrammatic elevation showing the principal elements of a regenerative system of train control constructed in accordance with my invention.
Figure 2:
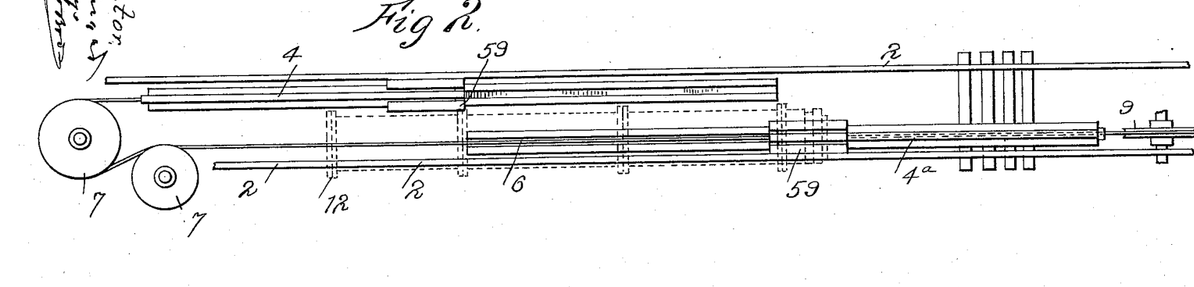
Fig. 2 is a plan view of the same.
Figure 3:
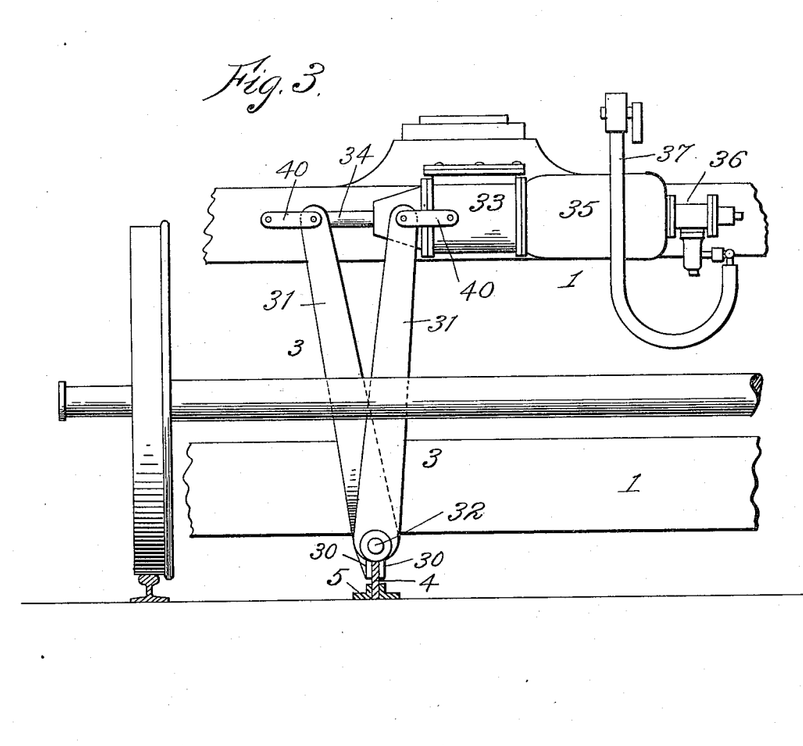
Fig. 3 is a partial end elevation exhibiting the grip mechanism of the preferred form.
Figure 6:
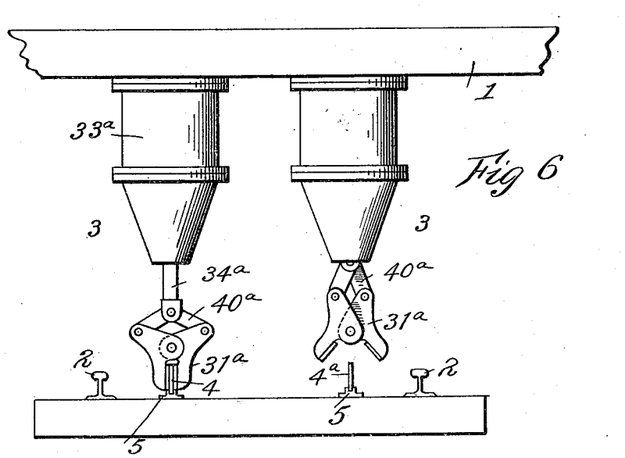

Referring to Fig. 1, 1—1 represent portions of the bodies or trucks of two cars of a train, preferably a portion of the truck, to eliminate as much as possible vertical motion relative to the track. To prevent obscuring the view the track wheels and the track are eliminated from this view, but the track is shown at 2 in Fig. 2. Depending from the car body or truck, preferably on each car of the train, are grips 3 whose construction, means of support and operation will be more fully described hereinafter. 4—4ª are, respectively, stopping and starting grip bars, preferably thin flat bars of steel arranged on edge to slide in parallel paths between the rails of the track, being guided by L-iron guides 5 (Figs. 3 and 6).

The grip bars 4—4ª are of sufficient width vertically to provide space for their gripping by the grips 3, and each bar is long enough to be gripped by all the grips of a single car or train, and preferably flexible enough laterally to permit of operation on curves.

Two grip bars are provided for each station and their rear ends are connected together as by a cable 6 running over guide sheaves 7—7 so that the movement of either grip bar is accompanied by the movement of the other grip bar in the contrary direction. The grip bar 4ª is furthermore connected at its forward end as by a cable 8, traveling over guide sheaves 9—9 with the piston rod 10 connected to piston 11 traveling in the elongated cylinder 12. The sheaves are preferably arranged horizontally and are so disposed as to bring the cable lines and grip bars parallel and on opposite sides of the track. On account of the great length of the piston rod it preferably lies upon or is carried by the bottom of the cylinder, while beyond the cylinder it is carried by guides or sheaves, and, if of the represented cylindrical rod-shaped make, as shown in Fig. 1, it will be connected to the lower portion of the piston and pass through a stuffing box 13 in the lower portion of the cylinder head, the lower side of the rod and stuffing box conforming to the contour of the interior of the cylinder and the lower side of the stuffing box being flush with the interior of the cylinder. The rear end of the cylinder is closed to afford an air cushion for the piston, and somewhat forward of the rear end is located a bleeding aperture 14, which may be controlled by the outwardly opening check valve 14ª, so as to maintain a partial vacuum in rear of the piston.

Figure 12:
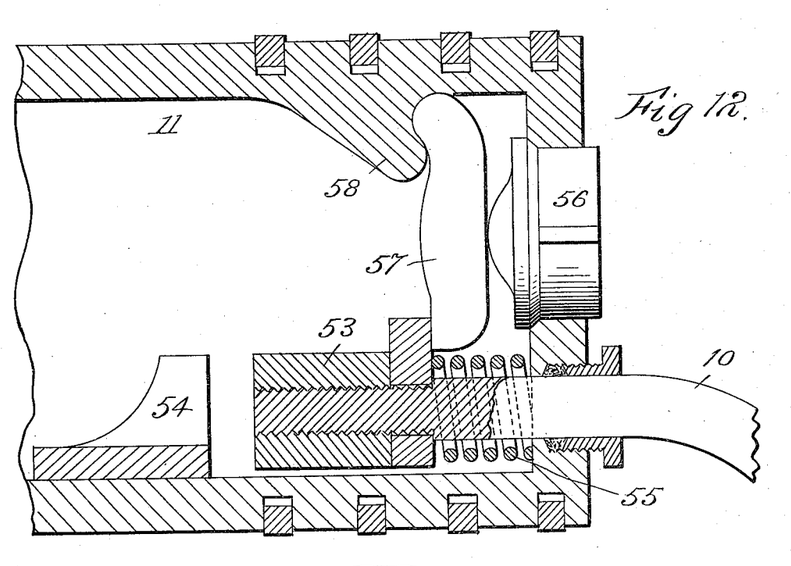
Fig. 12 is a sectional view of the forward end of the piston showing the safety release mechanism.
Figure 13:
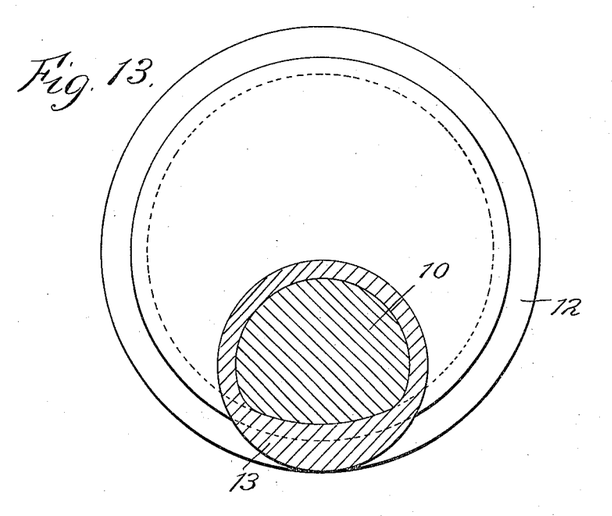
Fig. 13 is a sectional elevation taken transversely through the main cylinder stuffing box.

In Fig. 12 I have shown in detail the means preferred as a safety release in case of breakage occurring anywhere between the piston and the terminal buffer, hereafter described, which breakage might, but for the safety mechanism, release the piston and allow it to be driven rapidly inward, drawing with it all the mechanism attached to it.

Fig. 12 shows the front or high pressure end of the piston. The piston rod 10 is not fixed directly to the piston but passes through a stuffing box in the head thereof, and has an adjustable nut 53 which plays between a stop lug 54 fixed to the lower wall of the piston and the compression spring 55 encircling the piston rod and bearing between the front head of the piston and its seat in the nut 53. A large aperture in the head of the piston is controlled by a valve 56, held into its seat by a lever 57 fulcrumed at one end on a shoulder or lug 58 on the wall of the piston and bearing at its other end against the forward face of the nut 53. It will be seen that the spring 55 is held normally in a state of compression by the pull on the piston rod and when this is released by a breakage, such as described, the spring will force the nut 53 and piston rod rearward, and this action aided by the high pressure on the outer face of the valve 56 will open the valve, and compressed air in front of the piston will rush through the passage in such quantities as to fill up the vacuum in the rear of the piston and substitute considerable back pressure, which will not be allowed to escape so fast through the small bleeding valve at the rear of the cylinder as to deprive it of its function of arresting a rearward motion of the piston. When the piston, due to its enormous velocity, fetches up on this air in rear of the piston, it will force the valve 56 shut and will be brought to a cushioned stop between the two bodies of compressed air on opposite sides of it. The forward end of the cylinder has also a cushioning space between the end of the cylinder and the air pipe 15 leading from the compression end of the cylinder into the compressed air tank or reservoir 16. A normal or starting pressure of say, 400 lbs. is maintained in the reservoirs 16 throughout the system. This may, for example, be done by an air pump at some point connected to the pipe 17 which in turn is connected to each of the reservoirs 16 by a branch pipe 18 controlled by a valve 19, which in turn is controlled either by hand or by the pressure in the adjacent reservoir.

By working with high initial pressure the losses of energy due to heat of compression are lessened, and a better working pressure obtained within smaller limits. To conserve the heat of compression the cylinder, air pipes and reservoir may be jacketed in any suitable manner. Any loss of energy due to heat dissipation may be compensated for by reheating the air. This is preferably done at the moment of starting of the train, and by means of a steam jet which may be supplied to the interior of the reservoir 16, or to the air in the cylinder by means of a pipe 20 governed by a valve 21, which may be controlled by hand, but is preferably automatically opened for an instant by the train itself as it starts to leave the station. This may, for example, be done by connecting the lifting lever 22 of the valve to the core 23 of the solenoid 24, one end of the circuit 25 of which may be grounded, while the other end is connected to the short rail 26 insulated and adapted to receive at the proper moment a contact shoe 27 connected with the supply circuit, as for example, with the trolley or trolleys of the car or train. Signal flags or balls 28 placed along the track, and which may be painted or lighted in different colors, indicate distances from the stopping point of the train in rods or yards, and the speed indicator 29 will exhibit to the motorman the speed of travel of the train.

Figure 4:
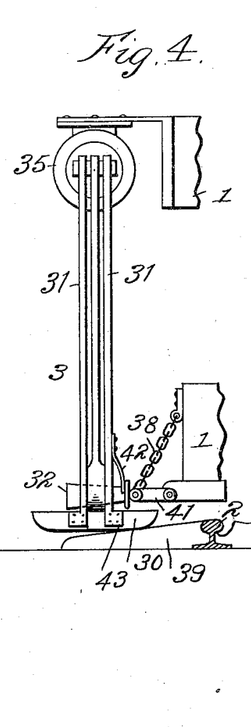
Fig. 4 is a side view of the grip mechanism and some of the contiguous parts.

The preferred form of the grip construction is shown in Figs. 3 and 4. The jaws 30 of the grip are formed at the lower ends of the levers 31—31 pivoted together by the pin 32, and one of them connected to a rigid point, as for example, to the air cylinder 33, while the other lever is connected to the piston rod 34 of such cylinder. The air cylinder has the auxiliary reservoir 35, automatic valve control 36, branch air pipe 37, and main or train air pipe with its controlling engineer's valve, like air brake controlling mechanism now in use.

As shown in Figs. 3 and 4 the grip is carried by one of the truck transoms. The grip bar being preferably guided immediately on or above the cross ties, and it being necessary, therefore, to have the jaws of the grips extend below the top of the rails, it is necessary that the jaws have some liberty of vertical motion to cross switches, etc. To this end the construction shown in Fig. 4 is adopted. The grip is sustained by a chain 38 from a rigid portion of the truck frame which enables the grip to rise when its jaws are being guided over a rail 2, as by means of the inclined guides 39. To allow this movement also the connection of the levers 31 to the air cylinder and the piston rod is by means of links 40. The grips are prevented from movement in the direction of the strain upon them both by the chain 38 and by a link 41 connected at one end to a rigid portion of the truck, and at the other end to the pivot pin 32. It is desirable that the jaws 30 shall automatically grip the grip bar when the car or train carrying the grips runs up to the station, bringing the jaws of the grip astride the starting grip bar, and that they shall automatically release said grip bar at certain points, for example, that the jaws of the starting grip shall release the starting grip bar as soon as the train has reached its maximum speed, and is traveling faster than the grip bar. This may be accomplished, as shown in Fig. 4, by forming the pin 32 with a taper in a direction contrary to that of the strain upon the grip. A spring 42 fixed to the grip at one end and bearing behind a flange or shoulder of pin 32 at the other end holds the pin 32 in such position as to take up loose motion in the pivot bearings of the grip and hold the jaws in such position that when the grips of a car or train run over and astride the bar, the forward motion of the bar moving between and in contact with the grip jaws, will loosen the grips and prevent gripping action but the slightest reverse motion of the bar, as will occur by reason of the rearward pull of the fluid pressure piston, will tighten the grip upon the bar. When the grip is in action the tendency of strain is to force the jaws of the grip toward the wider end of the pivot pin and so tighten them, while causing them to grip the bar more firmly, but when the strain upon the grip is reversed, as for example, when the starting grip bar has reached the limit of its motion and is commencing to stop and the grip is, therefore, traveling faster than the grip bar the jaws of the grip will be drawn in the direction of taper of the pin, and so instantly loosen the grip of the jaws upon the grip bar, allowing the grip to run free.

Figure 5:
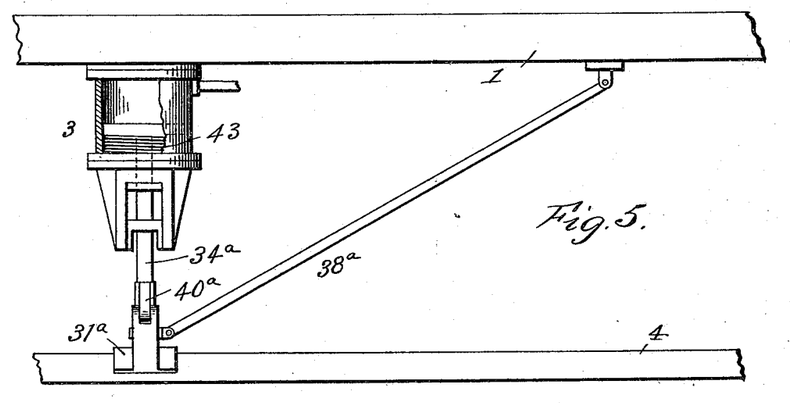
Figs. 5 and 6 are, respectively, side and end elevations of a modified form of grip mechanism.

In the substitute form of grip shown in Figs. 5 and 6 the grip levers 31$^a$ are connected by pivoted links 40$^a$ to a vertical piston rod 34$^a$ disposed in a vertical air cylinder 33$^a$, which is controlled by air pipes and valves, as in the case of the construction shown in Figs. 3 and 4. In this form the grip is normally held above the track, and is thrown down pneumatically just before or at the time of stopping of the car or train. To hold the grip normally up out of the way a compression spring 43 is arranged under the piston of the air cylinder, or otherwise suitably disposed so as to exert a permanent lifting effect upon the grip. The grips are held to resist the strain which comes upon them when they grip the grip bar by a rod or chain 38$^a$ connected at one end to the pivot of the grip and at the other end to a portion of the truck frame or car body. It will be apparent that the direction of strain for the starting grip is opposite to that for the stopping grip, and therefore, the chain or rod 38 or 38$^a$ will be disposed on opposite sides of the two grips, that is to say, while for the stopping grip the chain or rod will run in an inclined direction forward, the chain or rod for the starting grip will run in an inclined direction rearward to its attachment on the frame of the truck or car body.

Figure 7:
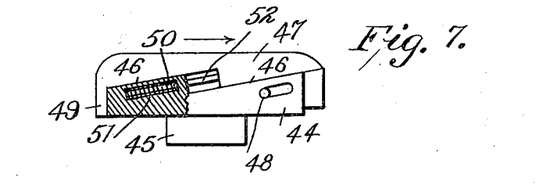
Fig. 7 is a horizontal sectional view of a grip-jaw.

Whichever form of grip mechanism is employed I prefer to have an automatic tightening action of the shoe of the jaw of the grip by the employment of a structure for the shoe and jaw such as is most fully shown in Fig. 7. As here shown the body portion 44 of the grip jaw has a neck, rib or other suitable means 45 for securing it to its lever of the grip, and its inner face, that is to say, its face which projects toward the opposite jaw, has one or more inclined surfaces 46, against which bear similarly inclined surfaces on the rear of grip shoe 47. The grip shoe is connected to the body 44 of the jaw by one or more pin and slot connections 48 so as to permit it limited motion in a plane parallel to the inclined surfaces 46. The front and rear of the shoe are rounded to facilitate passage on and off the grip bar. The front of the shoe or other suitable point has a shoulder or stop 49 engaging the front or other part of the jaw body 44, to limit the relative motion of the shoe upon said body. Suitable means are employed for holding the shoe normally toward the rear, at which point the inclined surfaces 46 hold it against the grip bar. These may be a spring 50 in a seat 51 engaged between the bottom of the seat and a shoulder or projection of a pin 52 connected to the shoe 47. Thus any strain upon the shoe in direction of the arrow, Fig. 7, will tend to hold the shoe at its outermost position upon the inclined surfaces 46, in position to tighten its grip upon the grip bar, but any reverse strain will cause the shoe to slide upon the inclined surfaces and automatically and instantly loosen its hold upon the grip bar.

Figures 8, 9, 10, 11:
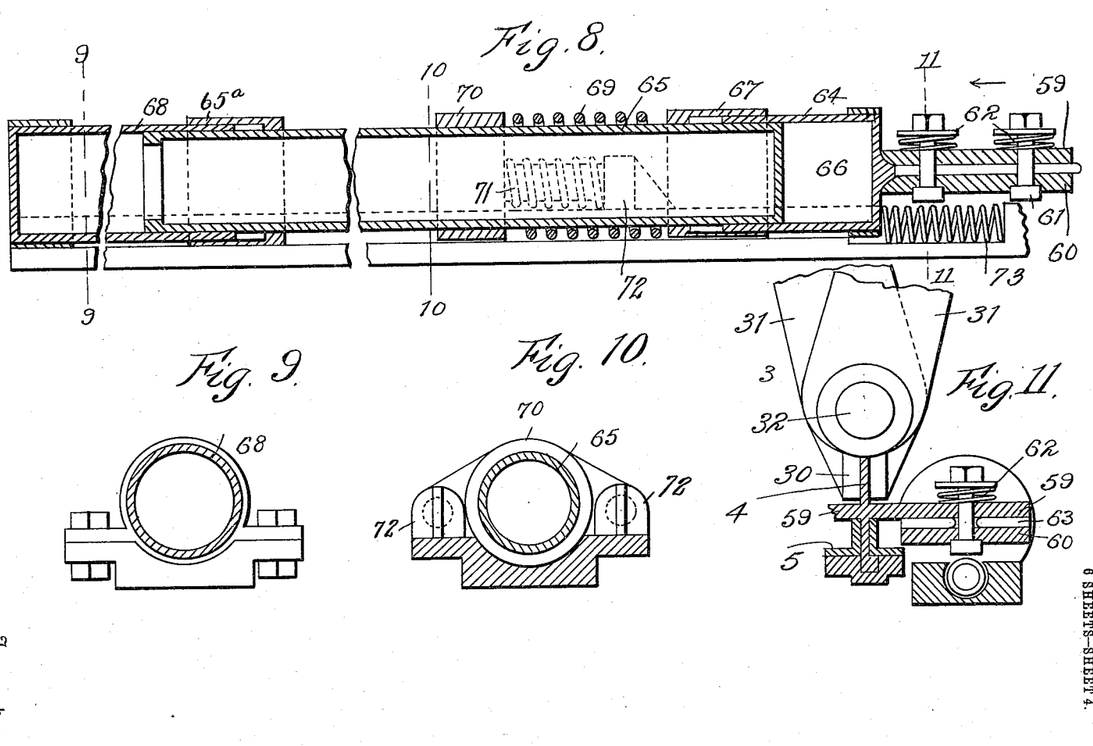
Fig. 8 is a longitudinal sectional view of the buffer mechanism for stopping the grip bar at the end of its travel.
Figs. 9, 10 and 11 are sectional views of the same mechanism taken on the several lines of section indicated on Fig. 8, and in Fig. 11 the lower end of the grip is also shown in elevation, and the grip bar in transverse section.

It will be seen by inspection of Fig. 1, that when the grips are applied to grip bar 4 with the train moving in the direction of the arrow, the bringing up of the piston 11 by the air cushion at the front end of the cylinder will stop the piston, cables and grip bars, the strain coming against the said air cushion, and that when the piston moves in the reverse direction toward the rear end of the cylinder it will be stopped by the air cushion at the rear end. At this moment, however, the stopping grip bar 4 is moving in a direction reverse of the arrow, and means must be employed for stopping it when it reaches the rear limit of its movement; also the connecting cables and the other grip bar. To this end I have provided the terminal buffer shown in Figs. 8 to 11. On the forward end of the stopping grip bar on each side is formed a short flange 59 which strikes the buffer and so arrests the grip bars and cables when the grip bar 4 is moving in a direction contrary to the arrow Fig. 1. Preferably, this is accomplished as follows:—Below each flange 59 is arranged a flat plate 60 forming with the flange 59 a pair of jaws, which are preferably rounded at their rear edges, as shown in Fig. 8. The two jaw members are connected together by sliding bolts 61 surrounded by springs 62 tending to hold the jaws together. To the front of the buffer is fastened a tongue 63 bifurcated as shown in Fig. 11 to allow passage to the bolts 61. Thus when the jaws 59, 60 carried by the grip bar, move on to the tongue 63 in the direction of the arrow, Fig. 8, they will promptly seize the tongue between them and the buffer action will be partly accomplished as they move to the limit of their play on such tongue, reaching the position shown in Fig. 8.

The tongue 63 is a projection from the buffer, and preferably as here shown, it is carried by a preliminary buffer cylinder or dash-pot 64 sliding with its stuffing box 67 upon the main hollow buffer piston 65, and having a space 66 filled with air between it and the front head of the main buffer piston, so as to further ease the starting blow of the grip bar and its attached mechanism upon the buffer. The main buffer piston 65 plays in a cylinder 68 through stuffing box 65$^a$, and when it is started in motion by the consecutive action of the frictional bearing of the jaws 59, 60 upon the tongue 63, and the pressure of the air in chamber 66, it moves rearward against the resistance of the air within it and within the cylinder 68 until the grip bar and its attached mechanism are brought to a standstill. At this point in the operation, the main fluid pressure piston 11 is at the extreme inner end of its stroke and is held there by the normal high pressure maintained in front of it at all times—so that the buffer will remain in the compressed condition above described until the next train picks up the stopping grip bar and draws it forward in direction the reverse of the arrow, Fig. 8. The buffer will expand in the direction of movement of the grip bar, keeping the tongue 63 in engagement with the jaws 59, 60. The action of the air in the dash-pot in thus restoring the latter to normal extended condition is aided by the compression spring 69 engaging between the stuffing box 67 of the dash-pot and a cross head 70 on the plunger 65. Springs 71 carried by fixed abutments 72 are next engaged by cross head 70 of the main plunger, arresting the outward movement of the latter and bringing it to a cushioned stop. A further cushion is supplied by coiled spring 73 engaged by the front end of the buffer— that is to say, in the present instance, by the dash-pot 64—when it reaches its most extended condition. At this point the buffer expansion is stopped and the continued forward movement of the grip bar draws the jaws 59, 60, away from the tongue 63.

Figure 14:
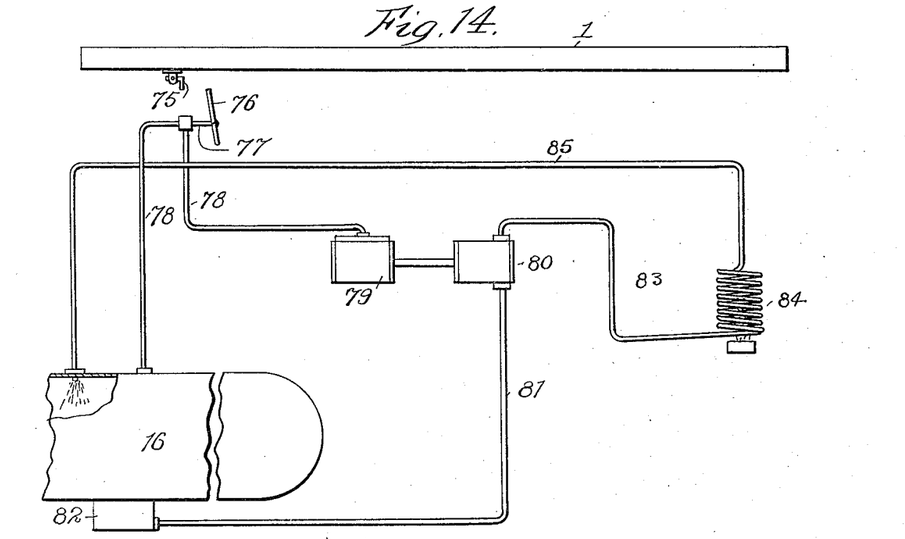
Fig. 14 is a diagrammatic view illustrating means of automatically introducing steam into the compressed air.

In Fig. 14 I have shown a modified construction of the apparatus for supplying a steam jet to the compressed air in the cylinder which is controlled by the car or train to cause water to be pumped into a flash boiler where it is expanded into steam and injected into the air reservoir at the moment of starting of a train. This is in substitution for the means already described of controlling a valve for admitting steam under pressure to the air reservoir. As here shown there is carried upon the car 1 a dog 75 which strikes and moves the lever 76 in one direction of motion of the car, but pivots freely, and so slides over said lever in the opposite direction of motion. The lever 76 is placed at some point in the track so as to be struck just as the car or train is starting from a station and operates a piston valve 77 controlling a pipe 78, which leads compressed air from the reservoir 16 to the cylinder of an engine 79 whose piston operates a plunger in the pump 80. That side of the pump 80 is connected by the pipe 81 to a water supply, for example, to the drum 82, receiving water of condensation in the reservoir 16, while its outlet is connected by the pipe 83 to the coil of the flash boiler 84 which has a suitable heating means and which is connected by the pipe 85 to the upper part of reservoir 16, or other place where a jet of steam is preferably applied to the air at the moment of its beginning to propel the main piston 11 for starting the train. It will now be seen that when the car in starting from the station strikes the lever 76 the pump 80 will be operated to throw water into the flash boiler and project into the reservoir 16 a jet of steam, so as to make up for the loss of heat or to bring the pressure up to any required normal standard.

Figures 15, 16:
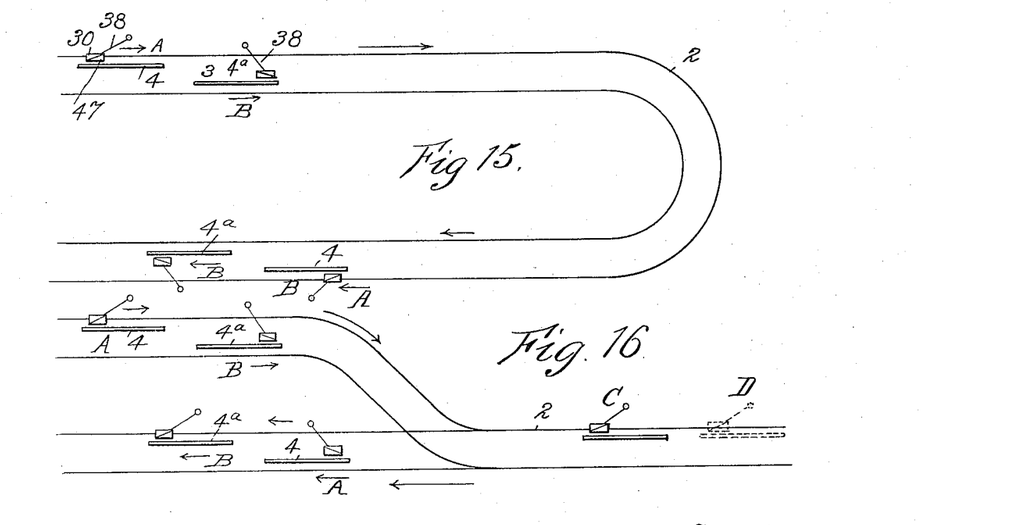
Figs. 15 and 16 are diagrammatic plan views showing respectively, the relations between the grips and the grip bars on a loop, and on a dead end.

In Figs. 15 and 16 I have illustrated a method of operating the grips on a curved and on a dead end track. The grip jaws are shown at 30, the grip shoes at 47, and grip bars at 4, 4ª. The diagonal line between the grip jaw and shoe shows diagrammatically the direction of motion of the shoe upon the jaw for tightening and loosening the grip action, while the diagonal arrangement of the rod or chain 38 indicates the direction of strain upon the grip.

Referring to Fig. 15, which illustrates the curved end of the track, it will be seen that with a train moving in the direction of the large arrow, the grip bar 4 is first seized by the grip moving in direction of the small arrow A, and that when the grip bar 4ª is seized by its grip its motion in direction of the arrow B will draw the grip with it, and so the car or train still is moving in direction of the large arrow, and that in both instances the strain upon the grip will tend to tighten the hold of the grip upon the grip bar. When the train has passed around the curve it will be seen that the grips and grip bars maintain exactly the same relation to each other. But, referring to Fig. 16, it will be seen that the functions of the grips on grip bars 4, 4ª, automatically reverse themselves when running on and off of a dead end. The grip which acted as the starting grip when running on, becomes the stopping grip when running off. In the same figure I have illustrated the fact that at the dead end two grip bars are not necessary as the stopping grip, shown at the position C, gripping the grip bar will draw it and the train to the position D, shown in dotted lines, where the station is located. Here the train is held by its brakes until when they are released it is again started in the reverse direction by the reverse action of the air upon the same bar and grips, carrying the latter back to the position C, and so starting the car upon its return trip.

Operation: As the train approaches a station the engineer at the point where he would ordinarily apply the brakes, applies air through a second engineer's valve to the stopping set of grips throughout the train. These grips simultaneously, and with just the right amount of gradually increasing pressure, grip the stopping grip bar 4, which drags with it the cables connecting it to the second or starting grip blade. The two grip blades are so connected together that as the stopping grip blade moves forward the starting grip blade moves rearward, until they have reached a position along side of, and parallel with, each other, at which point the station is reached. As each grip bar is somewhat longer than the train the second grip bar therefore completely underlies the train when it reaches the station and is in position to be seized by all of the starting grips thereof. The grip bars being also, as described, connected by cable to the piston of the cylinder 12, the motion of the stopping grip bar toward the station is accompanied by compression of air in the cylinder, and its storage in the reservoir 16. The cylinder must be longer than the distance which is to be allowed for stopping or accelerating a train, say, 300 feet. The piston rod being supported upon the bottom of the cylinder, no cramping results. Outside of the cylinder the piston rod may be carried on suitable ways or pulleys. The reservoir 16 is to be equal to the capacity of the cylinder and is charged with initial pressure, as described, to a degree depending upon the weight of train and the retardation and acceleration desired, both of which may be varied at times according to requirements of the management. When the train has been brought to a stop at the station by the retarding effect of compressed air, the starting grips are thrown in operation by their automatic actuating mechanism, or the motorman, by means of a third engineer's valve, sets them on to the second or stopping grip bar and the two sets of grips will be brought into action, the second set, however, not gripping the bar until the train has come to a full stop and starts slightly backward when the automatic action of the shoes of the second grips will seize the starting grip bar and the two sets of grips bearing in opposite directions with equal effort will hold the train stationary. Should the motorman set the second set of grips before the train has stopped, no harm will be done, as all the grips are made to grip only in one direction the stopping grip only when going faster than the stopping grip bar, and the starting grip only when the starting grip bar starts to go forward.

Upon getting the bell to start, the motorman now releases the first set of grips and the re-expansion of the compressed air accelerates the train up to a point where it goes faster than the accelerating grip bar, due either to the helping action of the motors on the train, or to the arresting of the grip bar by the cushion buffer; thereupon the starting grips automatically release the starting grip bar and the latter together with all its attached mechanism is brought to a standstill by the buffer.

The heavy weight of the cables, pulleys piston and piston rod and their momentum when traveling at the speed at which the train is going when they are released, renders essential a very effective buffer arrangement if the mechanism is to be stopped within a reasonable distance. To this end I have arranged the buffer having the several successive actions already described, and preferably the interior of the buffer cylinder is supplied with compressed air at high pressure from the compressor line pipe. When moving in the reverse direction, as the air within the buffer reacts to restore the parts to normal position, the mechanism is moving at a much lower speed, and may be stopped by means of the buffer springs shown.

The introduction of a jet of steam just as the train starts is intended to overcome losses by friction or radiation. It will be understood that the methods of supplying the steam are merely illustrative and that various substitute means may be employed.

It is not intended to do away with the motor, the motor control, or the ordinary air or hand-brake systems, which will be employed for emergencies.

Difference in the weight of trains may be taken care of by operating the grips at variable points, but it is preferably done automatically by allowing a lighter train to attain a slightly greater maximum speed, for, since the energy varies as the square of the speed and the maximum live load only increases the weight of the train 20% an increase in maximum speed of 4% of the unloaded train will be sufficient to bring both trains to a stop at the same point. In accelerating therefore, the trains are automatically put up to maximum velocities in inverse proportion to the square roots of their weights. When trains of different lengths are operated at the same time, the pointer or flag on the track shows exactly where grip application must be made for each length of train and the speedometer on the train indicates at which of these points grip application may be made, if the train for any reason is running at less than normal speed.

When operating on a dead end track the engineer's valves are so arranged that the No. 2 valve of one end is connected to the No. 3 valve of the other end, so as to reverse the functions of the two sets of grips without the necessity of the operator taking note of the change. In running on to a dead end, the accelerating or second set of grips are set on to the grip bar by valve No. 3 and when the operator goes to the other end of the train he naturally starts the train by opening valve No. 2 which releases the grips last set. If, however, the end of the track is a loop, then everything remains the same as if the track were one straight line. In either case the operator has no change of function—all he has to do is to open No. 2 valve when he comes to the place indicated on the track for him to do so, and then open No. 3 when the train is about to stop, and thirdly, to close No. 2 when he wishes to start; and finally, close No. 3 when he reaches another predetermined point. The time at which he will put on current and take it off in operating between the places where one grip bar is released and the next one seized will be worked out in each case for each station, and this too will be predetermined. In case of any interference or interruption of the predetermined program he will fall back upon the ordinary means of control, resuming the automatic method at the next station.

By having starting and stopping grip bars, as herein described, the action of the air reverses itself without the use of any valves in the compressed air regenerative part of the system.

Having thus described my invention what I claim as new and desire to secure by Letters Patent is:—

1. In apparatus of the character described, the combination of a grip bar connected with a piston operating in a cylinder against fluid pressure and located at a stopping point on a railway, a second grip bar connected to the first by a flexible connection passing around a pulley so that the bars approach and recede from each other, and grips on a car one or more adapted to engage with one grip bar to stop the car, and one or more adapted to engage with the other grip bar to start the car.

2. In apparatus of the character described, the combination of fluid pressure reservoirs located at intervals along the track, fluid pressure cylinders and pistons, the cylinders connected with said reservoirs to store fluid pressure therein, duplicate grip bars for stopping and starting arranged in pairs corresponding to said individual cylinders and connected to the pistons thereof, duplicate grips upon the car or train for engaging the respective grip bars, and means for causing engagement of said grips with said grip bars alternately.

3. In apparatus of the character described, the combination of fluid pressure reservoirs located at intervals along the track, fluid pressure cylinders and pistons, the cylinders connected with said reservoirs to store fluid pressure therein, duplicate grip bars for stopping and starting arranged in pairs corresponding to said individual cylinders and connected to the pistons thereof, duplicate grips upon the car or train for engaging the respective grip bars, and automatic means for causing engagement of said grips with said grip bars.

4. In apparatus of the character described, the combination of fluid pressure reservoirs located at intervals along the track, fluid pressure cylinders and pistons, the cylinders connected with said reservoirs to store fluid pressure therein, duplicate grip bars for stopping and starting arranged in pairs corresponding to said individual cylinders and connected to the pistons thereof and to each other so as to move in opposite directions at the same time, duplicate grips upon the car or train for engaging the respective grip bars, and means for causing engagement of said grips with said grip bars alternately.

5. In apparatus of the character described, the combination of fluid pressure reservoirs located at intervals along the track, fluid pressure cylinders and pistons, the cylinders connected with said reservoirs to store fluid pressure therein, duplicate grip bars for stopping and starting arranged in pairs corresponding to said individual cylinders and connected to the pistons thereof, duplicate grips upon the car or train for engaging the respective grip bars, and automatic means for disengaging the starting grips from the grip bars.

6. In apparatus of the character described, the combination of fluid pressure reservoirs located at intervals along the track, fluid pressure cylinders and pistons, the cylinders connected with said reservoirs to store fluid pressure therein, duplicate grip bars for stopping and starting arranged in pairs corresponding to said individual cylinders and connected to the pistons thereof, duplicate grips upon the car or train for engaging the respective grip bars, and means under control of the operator for applying and disengaging the grips.

7. In apparatus of the character described, the combination of fluid pressure reservoirs located at intervals along the track, fluid pressure cylinders and pistons the cylinders connected with said reservoirs to store fluid pressure therein, duplicate grip bars for stopping and starting arranged in pairs corresponding to said individual cylinders and connected to the pistons thereof, duplicate grips upon the car or train for engaging the respective grip bars, and compressed air apparatus controlled by the operator for operating said grips.

8. In apparatus of the character described, the combination of fluid pressure reservoirs located at intervals along the track, fluid pressure cylinders and pistons the cylinders connected with said reservoirs to store fluid pressure therein, duplicate grip bars for stopping and starting arranged in pairs corresponding to said individual cylinders and connected to the pistons thereof, duplicate grips upon the car or train for engaging the respective grip bars, means for applying and releasing the grips and the grip bars, said means being automatic in one direction and controlled by the operator in the other.

9. In apparatus of the character described, the combination of a fluid pressure actuated grip bar guided in the stationary way, a grip normally carried by the car, and mechanism for first lowering the grip to level of the bar and then forcing engagement therewith.

10. In apparatus of the character described, the combination of a fluid pressure actuated grip bar guided in the stationary way, a grip supported on the car and projecting below the top of the rails, and automatic means for lifting it at crossings and switches.

11. In apparatus of the character described, the combination of a stationary fluid pressure cylinder and piston, two grip bars having operative connection with the piston in opposition to each other, and independent grips upon the car or train for operating with said grip bars, whereby when both grip bars are connected to the grips, the car or train is held stationary.

12. In apparatus of the character described, the combination of car stopping mechanism, car starting mechanism, and a connection between them adapted to return the former to normal position upon operation of the other.

13. In apparatus of the character described, the combination of a stationary fluid pressure cylinder and piston, an elongated flexible grip bar connected to the piston, and grips on a car or train coöperating with said grip bar.

14. In apparatus of the character described, the combination with an elongated stationary cylinder, the piston thereof, an elongated piston rod, a grip bar guided in the stationary way and operatively connected to said piston rod, and a car having brakes and grips, the latter engaging the grip bar, whereby the car may be stopped, held, and started in reverse direction without manipulation of valves in said cylinder.

15. In apparatus of the character described, the combination of a fluid pressure cylinder and piston, two sets of gripping mechanisms on the car or train, and two grip blades located and guided in the stationary way, connected together by mechanism causing them to move oppositely, and also connected with the fluid pressure piston.

16. In apparatus of the character described, the combination of a grip bar guided in the stationary way, and a grip carried by the car or train and having a shoe automatically tightening on the grip bar in one direction of strain, and automatically freeing itself in the other direction of strain.

17. In apparatus of the character described, the combination with a pair of grip bars connected to move in opposite directions, and a pair of grips having shoes automatically freeing themselves in different directions of strain.

18. In apparatus of the character described, the combination of a grip bar guided in the stationary way, a grip having gripping jaws having shoes carried by said body portions, and guiding means for the shoes on such body portions inclined to the gripping plane of the jaws.

19. In apparatus of the character described, the combination of a grip bar, and a grip comprising two levers each bearing a gripping jaw, a tapered pin on which the levers are loosely pivoted, and means for holding the pin from endwise movement.

20. In apparatus of the character described, the combination of fluid pressure cylinders and their pistons located adjacent to the track, duplicate grip bars arranged in pairs on opposite sides of the track and connected to said pistons, a cable connecting the paired grip bars, and a pulley on which said cable travels arranged substantially horizontally and so disposed as to cause the grip bars to move in opposite directions at the same time.

21. In apparatus of the character described, the combination of fluid pressure cylinders, pistons therefor, means for connecting said pistons to and disconnecting them from a car or train so as to propel the car or train in the same direction for both directions of movement of the piston.

22. In apparatus of the character described, the combination of fluid pressure cylinders, pistons therefor, means for connecting said pistons to and disconnecting them from a car or train, the cylinder having an air outlet at its suction end.

23. In apparatus of the character described, the combination of fluid pressure cylinders, pistons therefor, means for connecting said pistons to and disconnecting them from a car or train, the cylinder having a valved air outlet at its suction end.

24. In apparatus of the character described, the combination of fluid pressure cylinders, pistons therefor, means for connecting said pistons to and disconnecting them from a car or train, the cylinder having an air outlet some distance from its suction end.

25. In apparatus of the character described, the combination of fluid pressure cylinders, pistons therefor, means for connecting said pistons to and disconnecting them from a car or train, the cylinder having a valved air outlet at some distance from the suction end.

26. In apparatus of the character described, the combination with a fluid pressure reservoir, a cylinder located adjacent to the track and having a pipe leading to said reservoir, and a piston for said cylinder having means for connecting to and disconnecting it from a car or train on said track.

27. In apparatus of the character described, the combination with a fluid pressure reservoir, a cylinder located adjacent to the track and having a pipe leading to said reservoir from said cylinder at a point some distance from the compression end of the cylinder, and a piston for said cylinder having means for connecting to and disconnecting it from a car or train on said track.

28. In apparatus of the character described, the fluid pressure reservoir heat insulated, a cylinder having a pipe leading therefrom to said reservoir and located adjacent to the track, and a piston for said cylinder having means for connecting it to and disconnecting it from a car or train.

29. In apparatus of the character described, the combination of stationary means of storing compressed air, means for connecting a car or train to said pressure storing means and disconnecting it therefrom, and means for supplying steam to the air under pressure.

30. In apparatus of the character described, the combination of stationary means of storing compressed air, means for connecting a car or train to said pressure storing means and disconnecting it therefrom, a steam supply, and means for controlling the admission thereof to the compressed air.

31. In apparatus of the character described, the combination of stationary means of storing compressed air, means for connecting a car or train to said pressure storing means and disconnecting it therefrom, a steam supply, and automatically operated means for controlling the admission thereof to the compressed air.

32. In apparatus of the character described, the combination of stationary means of storing compressed air, means for connecting a car or train to said pressure storing means and disconnecting it therefrom, a steam supply, and automatically operated means for controlling the admission thereof to the compressed air after the car has stopped.

33. In apparatus of the character described, the combination of stationary means of storing compressed air, means for connecting a car or train to said pressure storing means and disconnecting it therefrom, a steam supply, and automatically operated means for controlling the admission thereof to the compressed air as the car is starting.

34. In apparatus of the character described, the combination of an air storage reservoir, means operated by the stopping of cars or trains for storing air therein, means operated by the stored air for starting cars or trains, and means for heating the stored air.

35. In apparatus of the character described, the combination of an air storage reservoir, means operated by the stopping of cars or trains for storing air therein, means operated by the stored air for starting cars or trains, and means operated at the moment of starting the cars or trains for heating the stored air.

36. In apparatus of the character described, the combination of a compressed air reservoir, means operated by the stopping of a car or train for storing air under pressure in said reservoir, means operated by said air under pressure for starting cars or trains, means for injecting steam into the compressed air, and means for trapping out the water of condensation.

37. In apparatus of the character described, the combination of a compressed air reservoir, means operated by the stopping of a car or train for storing air under pressure in said reservoir, means operated by said air under pressure for starting cars or trains, means for injecting steam into the compressed air, and means for trapping out the water of condensation and reheating and restoring it to the compressed air.

38. In apparatus of the character described, the combination of stationary means of storing fluid pressure located at intervals along the way, means of stopping and starting cars or trains by such stored fluid pressure, and means for maintaining a substantially constant normal pressure in said storage means.

39. In apparatus of the character described, the combination of stationary fluid pressure reservoirs located at intervals along the way, means operated by the fluid pressure in said reservoirs for stopping and starting a car or train, and a pipe line connecting the reservoirs with each other and with a stationary source of fluid pressure.

40. In apparatus of the character described, the combination of an elongated horizontal fluid pressure cylinder, a piston, and an elongated piston rod supported at an intermediate point upon the bottom of the cylinder.

41. In apparatus of the character described, the combination of an elongated horizontal fluid pressure cylinder, a piston, and an elongated piston rod eccentrically connected to the piston and supported on the bottom of the cylinder.

42. In apparatus of the character described, the combination of an elongated fluid pressure cylinder, a piston, an elongated piston rod supported upon the bottom of the cylinder, and a bearing therefor in the lower portion of the cylinder head.

43. In apparatus of the character described, the combination of an elongated horizontal fluid pressure cylinder, a piston therein, and an elongated piston rod located at the bottom of said cylinder.

44. In apparatus of the character described, the combination of an elongated horizontal fluid pressure cylinder, a piston therein, and an elongated piston rod eccentrically connected to the piston and disposed upon the bottom of the cylinder.

45. In apparatus of the character described, the combination of an elongated fluid pressure cylinder, a piston therein, an elongated piston rod disposed upon the bottom of the cylinder, and a bearing therefor in the lower portion of the cylinder head.

46. In apparatus of the character described, the combination of an elongated fluid pressure cylinder, a piston, an elongated piston rod supported and guided in the lower portion of the cylinder, and means exterior to the cylinder for supporting and guiding the piston throughout its length.

47. In apparatus of the character described, the combination of an elongated fluid pressure cylinder, a piston, an elongated piston rod, and a stuffing box for said rod in the cylinder head, the under side of the rod conforming to the curvature of the cylinder, and the bearing thereof on the stuffing box conforming to and flush with the curvature of the lower part of the cylinder.

48. In apparatus of the character described, the combination of a fluid pressure cylinder, a piston having a valved high pressure face, a piston rod having bearing in said face so as to have longitudinal movement therein, and means of controlling the valve in the face of the piston by the piston rod.

49. The method of stopping and starting trains, consisting in simultaneously engaging a stationary retarding device with all the cars of the train, storing fluid pressure in a stationary reservoir by the momentum of the train in the act of stopping, and then employing the stored fluid pressure to start the train by reaction through the car engaging mechanism of all the cars.

50. The method of stopping and starting trains, consisting in simultaneously engaging a stationary retarding device with all the cars of the train, storing fluid pressure in a stationary reservoir by the momentum of the train in the act of stopping, then engaging a stationary accelerating device with all the cars of the train, releasing the retarding device and employing the stored fluid pressure to start the train by reaction through the stationary accelerating device, and the car engaging mechanism.

51. The method of stopping and starting trains, consisting in storing and maintaining at predetermined points along the way a supply of fluid pressure, engaging a train with a stationary retarding device to stop the train and add fluid pressure to said supply, and then employing the stored fluid pressure to start the train by reaction through the train engaging mechanism while maintaining the normal pressure in said supply.

52. The method of stopping and starting trains, consisting in simultaneously engaging a stationary retarding device with all the cars of the train, storing fluid pressure in a stationary reservoir by the momentum of the train in the act of stopping, and then employing the stored fluid pressure to start the train by reaction through the car engaging mechanism of all the cars, and injecting steam into the compressed fluid at the moment of starting the train.

53. In mechanism of the character described, the combination of car or train starting mechanism, and a yielding stopping mechanism independent of the car or train starting mechanism for bringing the car or train starting mechanism to rest.

54. In mechanism of the character described, the combination of car or train starting mechanism, and a buffer independent of the starting mechanism for bringing the moving parts of the starting mechanism gradually to rest after being released by the train.

55. In mechanism of the character described, the combination of car or train starting mechanism, and a pneumatic buffer independent of the starting mechanism for bringing the moving parts of the starting mechanism gradually to rest after being released.

56. In mechanism of the character described, the combination of car or train starting mechanism, and a pneumatic buffer comprising a preliminary and a main pneumatic buffing cylinder and plunger independent of the starting mechanism for bringing the moving parts of the starting mechanism gradually to rest after being released.

57. In mechanism of the character described, the combination of car or train starting mechanism, and a yielding stopping mechanism independent of the car or train starting mechanism comprising a frictional stop and a pneumatic buffer for bringing the car or train starting mechanism to rest.

58. In mechanism of the character described, the combination of a starting grip bar having buffer jaws, and a pneumatic buffer cylinder having a tongue to engage said jaws.

59. In apparatus of the character described, the combination of car or train starting mechanism, pneumatic stopping mechanism for the starting mechanism, and gradual stopping mechanism for the pneumatic stopping mechanism.

60. In apparatus of the character described, the combination of car or train starting mechanism, pneumatic stopping mechanism for the starting mechanism, and gradual spring stopping mechanism for the pneumatic stopping mechanism.

61. In apparatus of the character described, the combination of a fluid pressure cylinder, a piston having a valved high pressure face, a piston rod, and means of controlling by the piston rod the valve in the face of the piston.

62. In apparatus of the character described, the combination of a fluid pressure cylinder, a piston having a valved face, a piston rod having limited sliding motion endwise in the piston, and a lever controlled by the piston rod and controlling the valve in the face of the piston.

63. In apparatus of the character described, the combination of a fluid pressure cylinder, a piston and piston rod, and means controlled by strain upon the piston rod for admitting fluid in rear of the piston.

64. In apparatus of the character described, the combination of a grip bar guided in the stationary way, a grip carried by a car or train, and means for automatically engaging the grip with the grip bar in one direction of strain and automatically freeing it in the other direction of strain.

65. In apparatus of the character described, the combination of a fluid pressure cylinder, a piston having a valved face, a piston rod having a limited sliding motion in the piston, a spring for cushioning the movement of the piston rod, and means of controlling the valve in the piston face by the piston rod.

66. In apparatus of the character described, the combination with car stopping and starting mechanism having one member normally in operative position for stopping the car and another member normally in inoperative position for starting the car; of means for moving said starting member to operative position in the act of stopping the car.

67. In apparatus of the character described, the combination with car stopping and starting mechanism having one member normally in operative position for stopping the car but adapted to be moved by the car to an abnormal position in the stopping operation, and another member normally in inoperative position for starting the car; of means for moving said starting member to operative position in the act of stopping the car; and means for moving both of said members to normal position in the act of starting the car.

68. In apparatus of the character described, the combination of an energy storing element, a pair of members reversibly movable in opposite directions, and connections between said reversibly movable members and said energy storing element to successively effect the storage of energy in the latter when one of said members moves in one direction and the return of the stored energy in the form of movement of the other member in the same direction.

69. In apparatus of the character described, the combination with a device for storing and returning energy and a pair of members reversibly movable in opposite directions; of connections for causing said device to store energy when one member moves in one direction and return the available stored energy in the form of movement of the other member in the same direction, and means for successively securing to said members a body to be arrested and started.

WALTER H. KNIGHT.

Witnesses:
WM. P. HAMMOND,
P. F. SOWNCH.

Copies of this patent may be obtained for five cents each, by addressing the "Commissioner of Patents, Washington, D. C."